Jan. 19, 1932.     S. C. McKEOWN     1,841,543
FLUID GAUGE

Filed Nov. 18, 1926

INVENTOR
SAMUEL C. McKEOWN
BY
A. D. T. Libby
ATTORNEY

Patented Jan. 19, 1932

1,841,543

UNITED STATES PATENT OFFICE

SAMUEL C. McKEOWN, OF MOUNT VERNON, NEW YORK

FLUID GAUGE

Application filed November 18, 1926. Serial No. 149,043.

This invention relates to a fluid pressure gauge, and is particularly adapted for use as an instrument in measuring the amount of gasoline in a supply tank such as carried on an automotive vehicle, or the oil pressure used in connection with the lubricating system on an internal combustion engine.

While these two specific uses are mentioned, the instrument is not necessarily limited to such uses, but is useful wherever a pressure indicating instrument can be utilized.

It is the object of my invention to provide a pressure gauge which has a minimum number of comparatively strong parts, whereby the cost of production may be kept to a minimum, without sacrificing reliability and life of the instrument.

I have found that where springs are used in gauges, of the class described, particularly thin springs, which type of springs are commonly used for returning the moving element back toward normal condition on reduction of pressure that these springs are very apt to get out of order and it is therefore another object of my invention to provide a gauge in which no springs whatever are used.

Another object of my invention is to provide a construction in which adjustments for the purpose of calibrating the instrument may be readily and quickly made.

These and other objects will be apparent after a study of the specification taken in connection with the annexed drawings, wherein Figure 1 is a plan view of the instrument without the enclosing casing, and with the indicating dial removed.

Figure 4 is a side view of Figure 3 showing a portion of the operating lever in dotted lines, while

Figure 1:
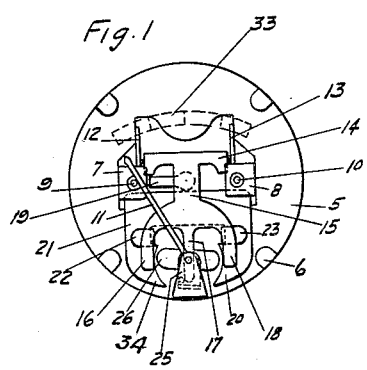

In the drawings, 1 is a casing carrying a diaphragm 2, in such a manner as to provide a small chamber 3, within which pressure is set up through the nipple 4, that is fastened to the case 1.

It is to be understood that suitable pipe connections are made to the nipple 4, extending the chamber 3 to the vessel or reservoir within which pressure is set up and transmitted to the chamber 3. Carried by the outer edge of the casing 1, is a plate 5, held in position by a plurality of ears 6, preferably integral with the casing 1. The plate 5, has a plurality of lugs formed outwardly from the surface thereof, one pair of these lugs 7 and 8 carry pins 9 and 10, which act as stops for indicating needle or pointer 11. These pins also serve to carry a dial bearing scale divisions or the like.

Another pair of lugs 12 and 13, support the bridge portion 14 of a lever 15. The lever 15 is provided with three fingers 16, 17, and 18, the fingers 16 and 18 extend over and closely adjacent poles 34 and 20 of a permanent magnet 21. The magnet 21 is fastened to the plate 5 by lugs 22 and 23 integral therewith, and which are bent over so as to act as stop members for the fingers 16 and 18 whereby the same are kept from coming into absolute contact with the magnet 21.

It is to be understood that the fingers 16 and 18 at least of the lever 15, are of magnetic material, and as shown in the drawings, I prefer to make the bridge 14 with the fingers 16, 17 and 18, all an integral part of the lever 15, and to make this out of magnetic material, which is preferably tinned or otherwise treated to prevent rusting.

Motion is transmitted to the lever 15, through the medium of a rather rigid member 19, preferably fastened to the diaphragm, with contacts with the lever 15.

The member 19 is so constructed that it may be readily bent with a proper tool for the purpose of adjusting the tension or the lever ratio.

The plate 5 also has a lug 24, extending upwardly therefrom, and bent over to form finger 25. Pivoted between the inner end of the finger 25 and the plate 5, is a moving element, comprising an armature 26, from which there extends at right angles a portion 27 and extending from portion 27 substantially parallel to the armature 26 is a portion 28.

Figure 2:
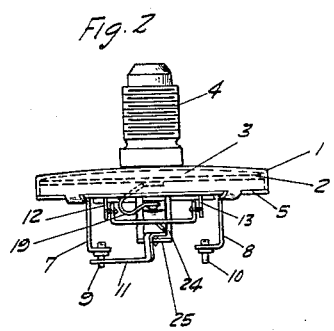
Figure 2 is a view of Figure 1 looking from the top.
Figure 3:
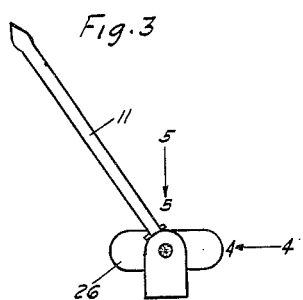
Figure 3 is an enlarged plan view of the moving element.
Figure 5:
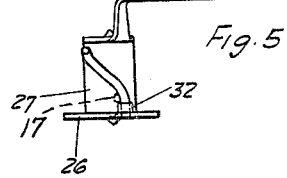
Figure 5 is a view of Figure 3 looking in the direction of the arrow 5—5 and also showing in dotted lines, the end of a part of the operating lever.

The part 28 carries a pivot point 29, while the armature 26 carries a pivot 30, the latter of which is seated in the plate 5, while the pivot point 29 has a bearing in the finger 25, as will be seen from Figures 1, 2, and 5. The armature 26 and the portions 27 and 28, and the pointer are preferably made integral from one piece of material, although it is to be understood that at least the armature may be made separately.

As shown in Figure 1, the armature 26 is positioned between the poles 34 and 20, so that the influence of the magnet tends to hold the needle against the stop 9, and the magnet, of course, acts to bring the armature back toward this position whenever pressure is reduced against the diaphragm 1.

Figure 4:
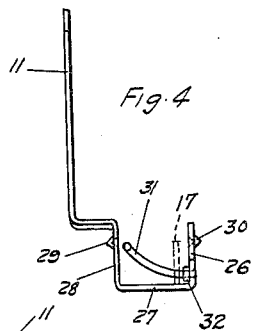

I have provided a rather unique arrangement for transmitting motion from the lever 15 to the movable element, and this comprises a member 31, which acts as a cam, as will be readily seen by reference to Figures 2, 4, and 5.

When there is no pressure on the gauge the middle finger 17 of the lever 15, is in engagement with the cam member 31, at a point near the boss 32. This position is indicated by the dotted lines 17 in Figures 4 and 5. The boss 32 is thrown upward so as to provide a supporting bearing for the member 31, which is preferably made out of a piece of wire of a suitable character that can be adjusted, yet which will retain its shape as pressure is applied from the diaphragm through the member 19 to the lever 15. The finger 17, rides up on the spiral 31, as will be clearly seen by reference to Figure 5, and this action turns the movable element on the pivots 29 and 30. The lever finger 17 may be adjusted sidewise or up and down to get the proper adjustment on the spiral cam. This is necessary as the diaphragm, in instruments of this kind, does not usually have uniform motion, but since both cam 31 and the finger 17 may be adjusted by suitable tools, the instrument may be calibrated so that the scale indicated by the dotted lines 33, may have substantially uniform, scale divisions.

I wish particularly to call attention to the type of pivots used in the moving element, as well as that used for supporting the bridge 14. These pivots are provided with accurately formed male and female parts direct from the pieces themselves, without requiring specially mounted separable bearings.

It will be seen that I have provided a gauge having, outside of the diaphragm, only two moving parts, namely the lever 15, and the movable element carrying the pointer and armature. The small magnet 21 attracts the fingers 16 and 18 and thus acts to return the lever 15 and the movable element toward zero or non-working position as the pressure is reduced against the diaphragm.

If in the construction of the instrument the magnet is found to be too strong, it may be readily reduced in strength by demagnetizing in any well known manner.

From what has been said it will be seen that I have provided an instrument of this class, which has a very few number of parts, and these parts are simple and easy to make. It is to be understood that certain of the details may be varied without departing from the spirit of my invention and the scope of the appended claims.

Having thus described my invention, what I claim is:

1. In a fluid gauge, a pressure operated diaphragm, a mounting plate adjacent said diaphragm, a lever pivotally supported on said plate, means cooperating between the diaphragm and lever for imparting to the lever motion from the diaphragm, a magnet carried by the plate, a movable member pivotally mounted on said plate and having an armature positioned between the poles of the magnet and also having a pointer, and an adjustable cam carried by said movable member for transmitting motion from the lever to said movable member.

2. A fluid gauge comprising but three integral movable parts; a pressure operated diaphragm, a single piece lever actuated by the diaphragm and a movable element including a one piece armature and pointer with interconnecting portions, operated directly by said lever; and a magnet acting on the armature and parts of the lever tending to return them to zero position.

3. In a fluid gauge, a pressure operated diaphragm, a lever actuated by the diaphragm, a movable element having a body of magnetic material and carrying a pointer and an adjustable cam; said cam serving to transmit motion from the lever to the movable member and a magnet acting on a part of said body tending to return it and the pointer to zero.

4. In a fluid gauge, a pressure operated diaphragm, a lever actuated by the diaphragm, a movable element carrying a pointer, means for transmitting motion from the lever to said movable element including an adjustable cam element on the movable member acted on by a part of said lever, means acting to move the movable member toward zero position when pressure on the diaphragm is reduced comprising; an armature on the movable member and a magnet acting on said armature.

5. In a fluid gauge, a pressure operated diaphragm, a lever actuated by the diaphragm, a movable element and a pointer actuated thereby, means for actuating said element from said lever, said means comprising a bendable member carried by the movable element and acted on by a part of said lever and means acting to return the movable element to zero position of the pointer, said means comprising; an armature on the movable element and a magnet acting on the armature.

6. In a fluid gauge, a pressure operated diaphragm, a lever actuated by the diaphragm, a movable element and a pointer actuated, thereby, means for transmitting substantially uniform motion to the pointer comprising; an adjustable cam on the movable element and an adjustable finger on said lever and means acting to return the movable element to zero position of the pointer, said means comprising; an armature on the movable element and a magnet acting on the armature.

7. A fluid gauge comprising, a pressure operated diaphragm, a lever actuated by the diaphragm, a movable member carrying indicating means and operated by said lever and a magnet acting on both the movable member and the lever tending to return them both to non-working position.

8. A fluid gauge comprising, a pressure operated diaphragm, a lever having three fingers, and operated directly by the diaphragm, a movable member having a pointer and a cam acted on by one of the fingers of said lever to move said movable member and a magnet having its limbs arranged to attract the other two fingers of said lever against the pressure of the diaphragm, said magnet also acting on a part of said movable member to return the same to zero position.

9. A fluid gauge comprising, a pressure operated diaphragm, a lever having three fingers, the outer two of which are of magnetic material, said lever being operatively associated with the diaphragm through an adjustable member, a movable member carrying indicating means, an armature and a cam, said cam being acted on by the central finger of the lever, which is adjustable to actuate the movable member, and a magnet having its limbs embracing said armature and also placed so as to attract said two limbs of the lever as and for the purposes described.

10. A fluid gauge comprising, a casing carrying a diaphragm so as to form a chamber, a plate carried by the casing adjacent said diaphragm, a magnet fastened to the top part of said plate, lugs extending upward from said plate, one pair of lugs adapted to support a dial, another pair of lugs pivotally carrying a lever having parts extending over the poles of said magnet, means for transmitting motion directly from the diaphragm to the lever, a single lug, having a finger serving with said plate to pivotally mount a movable member having an armature disposed between the poles of said magnet and a pointer, said movable member also carrying a spirally arranged member engaged by a part of said lever as and for the purposes described.

11. A fluid gauge comprising, a casing carrying a diaphragm so as to form a chamber, a plate carried by the casing adjacent said diaphragm, a lever pivotally carried on the plate, a movable member pivotally carried on the plate, means for transmitting the motion of the diaphragm to said lever and said lever having a part engaging directly a part on the movable member to move the same, all of said pivots being formed directly from parts of the plate and the members pivoted thereon.

In testimony whereof, I affix my signature.
SAMUEL C. McKEOWN.